United States Patent [19]

Rabinow

[11] Patent Number: 5,520,592

[45] Date of Patent: May 28, 1996

[54] BALANCED FORCE ANTI-SPIN FRICTION DRIVE

[76] Inventor: Jacob Rabinow, 6920 Selkirk Dr., Bethesda, Md. 20817

[21] Appl. No.: 349,184

[22] Filed: Dec. 5, 1994

Related U.S. Application Data

[63] Continuation-in-part of Ser. No. 202,164, Feb. 25, 1994, Pat. No. 5,407,399.

[51] Int. Cl.$^6$ .................................................. F16H 15/44
[52] U.S. Cl. .................................................. 476/51; 476/55
[58] Field of Search .................................. 476/51, 55

[56] References Cited

U.S. PATENT DOCUMENTS

| | | | |
|---|---|---|---|
| 1,247,732 | 11/1917 | Shelton | 476/26 |
| 3,158,041 | 11/1964 | Rae | 74/690 |
| 5,014,565 | 5/1991 | Stephenson | 74/190 |
| 5,407,399 | 4/1995 | Rabiniow | 476/55 |

FOREIGN PATENT DOCUMENTS

| | | | |
|---|---|---|---|
| 486191 | 5/1992 | European Pat. Off. | 476/51 |
| 1003009 | 11/1951 | France . | |
| 1234118 | 2/1967 | Germany | 476/55 |
| 1237827 | 4/1986 | Russian Federation | 476/55 |
| 1562565 | 5/1990 | Russian Federation | 476/55 |
| 26750 | 8/1907 | Sweden | 476/55 |
| 246343 | 9/1947 | Switzerland | 476/51 |
| 9457 | 4/1902 | United Kingdom | 476/51 |

OTHER PUBLICATIONS

Loewenthal, S. H. "Advances in Traction Drive Technology" NASA Technical—Prior Sep. 21, 1983 Memorandum No. 83397, Sep.1983.

Lubomyr O. Hewko "Automotive Traction Drive CVTs—An Overview" Sep. 1986.

*Primary Examiner*—Allan D. Herrmann
*Attorney, Agent, or Firm*—William D. Hall

[57] ABSTRACT

This invention relates to a friction drive that uses two straight sided cones, the apexes of which are located at a common point. A driving or driven roller is located between the two cones so that rotation of this roller causes (or is caused by) the rotation of the cones. The rotary axis of the roller passes through the point at the apexes of the cones. In this manner the roller element in contact with the surfaces of the cones becomes an element of a cone rolling correctly on the two cones without experiencing any spin. The use of two cones balances the forces on the roller and doubles the torque that can be transmitted between the roller and the cones. A different embodiment of the invention uses two or more rollers contacting the two cones. By changing the position of the rollers it is possible to obtain a very large speed ratio between the rollers.

2 Claims, 3 Drawing Sheets

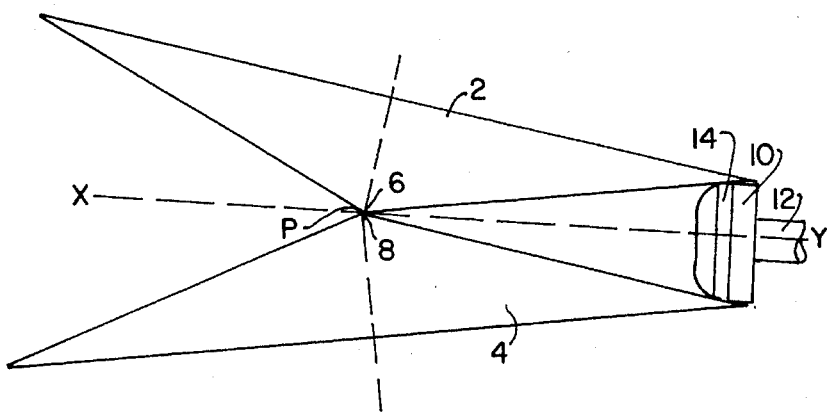
FIG. 1
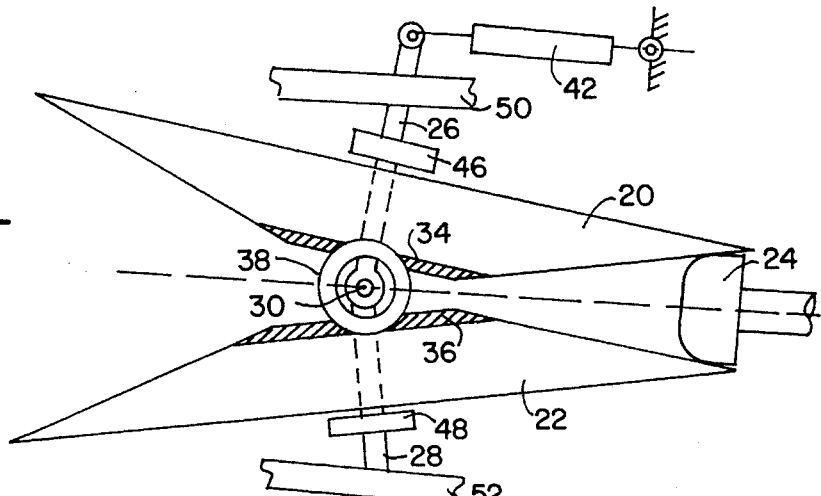
FIG. 2
FIG. 3
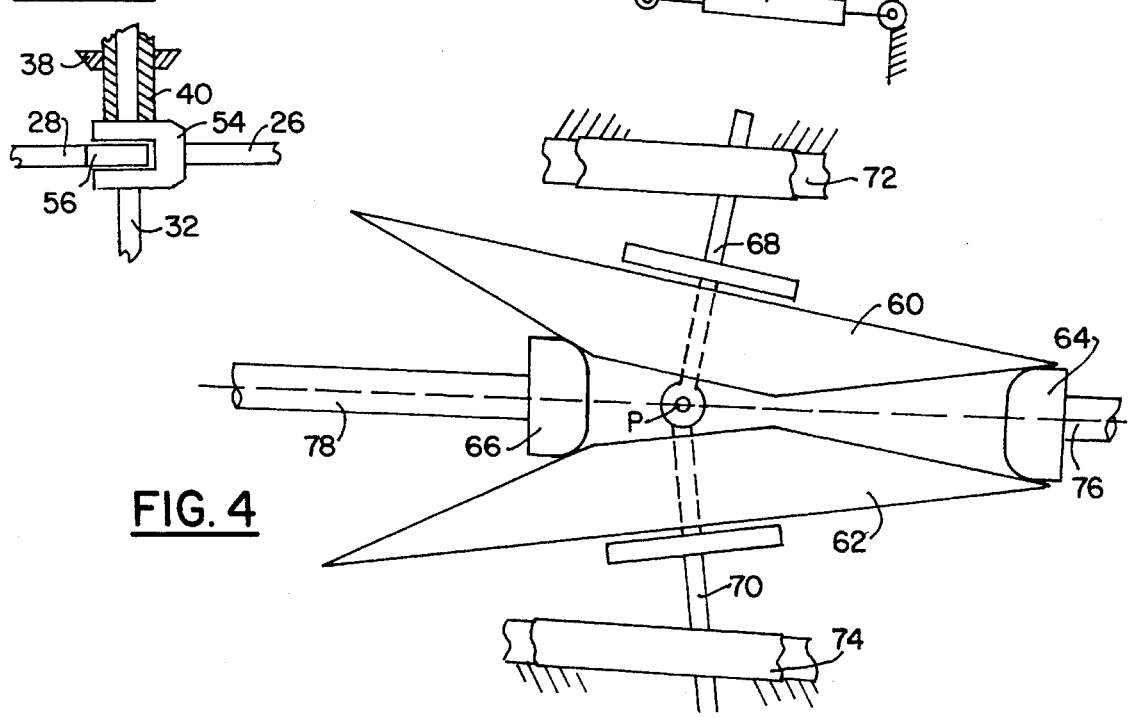
FIG. 4

BALANCED FORCE ANTI-SPIN FRICTION DRIVE

Continuation in part of my prior application Ser. No. 08/202,164 filed Feb. 25, 1994, entitled "Variable Speed Friction Drive," now U.S. Pat. No. 5,407,399.

BACKGROUND OF THE INVENTION

The art of friction drives is very old and very extensive. I covered some of this art in my co-pending patent application Ser. No. 08/202,164 filed Feb. 25, 1994 now U.S. Pat. No. 5,407,399. In that application I explained the basic theory that the only two bodies that can roll on each other without spin are two cones that have their apexes at a common point. More than two cones can roll on each other without spin if their apexes all meet at one point.

There are many patents or variable speed drives where one element can be located on various points of another element so as to obtain variable speed ratios. I found three patents, U.S. Pat. Nos. 3,158,041, 5,014,565, and French 1,003,009, that note that two friction elements must have a common apex for proper rotation on each other. Unfortunately for the inventors, all three of these patents use curved "cones" in contact with the rollers (a technically correct cone is only one generated by a straight line). Such curved "cone" arrangements can produce proper mutual rolling but only if the rollers contact the curved "cones" at very small areas.

The circular area of a roller rolling on a curved cone must be very narrow. If this area is increased, the rolling develops spin or slip because the "cone" surface is no longer such that various contact elements of the curved "cone" have a common apex.

Two Russian patents show rollers contacting disks so that the rotary axes of the rollers pass through the center point of the disks that the rollers are contacting. The Russian patents are No. 1237-827 to Nechitailo and No. 1562-565 to Ivashchenko. Both patents show very difficult-to-implement mechanisms in making the rollers move over the surface of the disks so as to vary the speed ratios. Instead of tipping the cone/s, as I do in my co-pending application Ser. No. 08/202,164 now U.S. Pat. No. 5,407,399 and in this application and keeping the roller on a fixed axis, the Russian patents show the roller axes as being constantly changed as the rollers are moved either toward or away from the center of the disks they contact.

SUMMARY OF THE INVENTION

To obtain appreciable amounts of torque that is to be transmitted by two or more machine elements in frictional contact with each other, large pressures are necessary between the elements.

A typical friction drive uses a roller in contact with a cone. By moving the roller along an element of the cone a variable speed transmission is achieved.

In this invention I use at least one roller that is in contact with two cones. The cones contact the roller at diametrically opposite areas. This enable me to arrange the mechanism so that the roller experiences only torsional loading so as to make its supporting and rotational means simpler and more sturdy than if the roller made contact at only one of its sides.

Speed variation is achieved by tilting the cones so that the axis of roller rotation always passes through the point where the apexes of the cones are located at all times.

In my co-pending application Ser. No. 08/202,164, now U.S. Pat. No. 5,407,399, I show that if I use a roller contacting a straight sided cone, and arrange the axis of the roller to pass through the apex of the cone at all times, the roller or wheel will roll over the cone without spin.

The area of the roller that contacts the cone can be increased without introducing spin or slip. The embodiments shown in my noted application use one roller in contact with one cone. It is obvious that it is desirable to contact the roller at more than one area. This would permit a greater amount of transmitted force and also balance the forces on the roller if opposite areas are contacted.

BRIEF DESCRIPTION OF DRAWINGS

FIG. 1 shows a simplified schematic arrangement of two cones in contact with one roller.

FIG. 2 shows some details of a possible working embodiment of the design of FIG. 1.

FIG. 3 shows a detail of the linkage between the two main cones of FIG. 2.

FIG. 4 shows an arrangement of two cones and two rollers that have a common axis.

DETAILED DESCRIPTION

Figure 5:
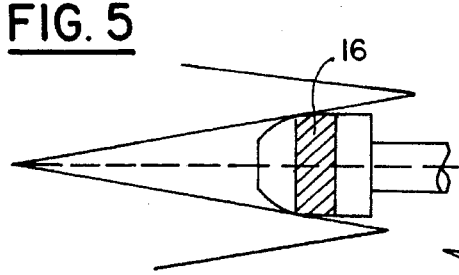
FIG. 5 shows the effect of widening the contact between a roller and the cones.

The basic arrangement of FIG. 1 shows the cones 2 and 4 arranged to have their apexes 6 and 8 meet at point P. A roller 10 mounted on or driven by shaft 12 is located so that it contacts both the cones 2 and 4. The rotary axis X-Y of the roller 10 passes through point P. The surface 14 of the roller 10 contacts the surfaces of the cones 2 and 4 and, because this surface rotates on the axis X-Y, this surface 14 is part of a cone that rolls correctly on cones 2 and 4 without spin. This surface can be widened with no penalty as shown at 16 in FIG. 5.

It should be understood that the contacting surfaces of friction drives need not contact each other without lubrication. In modern friction drives special lubricants are usually employed so as to keep the materials from contacting and still provide high friction forces between the contacting elements.

In FIG. 2, I show a possible mechanical arrangement of the scheme of FIG. 1.

Here the cones 20 and 22 are mounted on shafts 26 and 28, respectively. The shafts do not revolve and I do not show the usual details such as ball or roller bearings between the cones 20 and 22 and the shafts 26 and 28. I show collars 46 and 48 simply as schematic elements keeping cones 20 and 22 on shafts 26 and 28.

The two cones 20 and 22 are so located on the shafts 26 and 28 that their apexes (cut away in FIG. 2) meet at point 30. It is about this point that shafts 26 and 28 are arranged to pivot relative to each other. The mechanism for doing this is shown in FIG. 3. Here the two shafts 26 and 28 terminate in hinge elements 54 and 56 that can pivot about the vertical shaft 32 that can be fixed in the frame of the machine or be free to rotate in suitable bearings.

Mounted over this shaft 32 is a sleeve 40 that carries a bevel gear 38 whose function will be explained later.

In order to provide forces that would press cones 20 and 22 against the roller 24, I can use two hydraulic or pneumatic cylinders 42 and 44 to pull (or push for the design in FIG. 4) the shafts 26 and 28. (FIG. 2) The forces exerted by the cylinders 42 and 44 can be made a function of the load on the cones or on the roller. Such expedients to increase the friction forces as the load increases are well known in the art and need no discussion here.

I provide guides 50 and 52 to keep the shafts 26 and 28 in one plane and thus to keep the cones in correct relation to each other. The guides are part of the frame of the machine.

It is obvious that as the roller 24 revolves, it will cause the cones 20 and 22 to revolve in opposite directions. In my co-pending application Ser. No. 08/202,164, now U.S. Pat. No. 5,407,399, I show the use of universal joints to couple a shaft to a tilting cone. In the embodiment of FIG. 2 here, such power take-off would not be convenient. I now show a bevel gear 34 mounted, or cut integrally, with cone 20. Similarly, a bevel gear 36 is mounted on cone 22. Both bevel gears 34 and 36 are designed to have their apexes located at the central point 30.

A bevel gear 38 is mounted as explained earlier to rotate on shaft 32 so as to mesh correctly with the gears 34 and 36. The bevel gear 38 is mounted on sleeve 40 of FIG. 3. This sleeve 40 can extend as far out of the assembly of FIG. 2 as necessary to couple to outside machinery. This sleeve 40 is not shown in FIG. 2 to avoid covering the picture of the coupling between shafts 26 and 28.

It should be understood that while the usual arrangement in such drives is to use the roller 24 as the driver and the cones 20 and 22 as the driven members, this is not necessarily so. The cones can do the driving and the roller 24 can be the driven element.

While I show the bevel gears 34 and 36 attached to the smaller diameters of the cones 20 and 22, it is possible to attach two large bevel gears to the outer rims of both cones. The small central bevel gear 38 would then be very much larger and would approximately span the distance between the outer edges of the two cones 20 and 22.

The two hydraulic cylinders 42 and 44 can be replaced by two tension springs. This would not provide the ease of adjustment of the friction forces, but would be much simpler and provide increasing friction forces as roller 24 is moved toward the center of the machine. This would occur both because the spring would be stretched more as the cones separate at the right as viewed in FIG. 2, and because the lever arms between the springs and the points of contact between the roller 24 and the cones 20 and 22 became shorter.

Consider now the embodiment of my invention of FIG. 4.

Here I use two cones 60 and 62 pivoted again at point P. The cones revolve about two shafts 68 and 70 but the shafts are not under any constraints as those of FIG. 2. The shafts are guided as before by guides 72 and 74 that are attached to the frame of the machine.

Now I add a second roller 66 whose rotary axis is coincident with the axis of roller 64. This axis again passes through the point P which is the common axis point of cones 60 and 62.

The friction forces between the rollers 64 and 66 and the cones 60 and 62 are provided by the axial forces that can be exerted by either the shaft 76 or the shaft 78 or both. It is obvious that if the position of one of the rollers is fixed, pushing the other roller toward the point P will increase the friction forces between both rollers and the cones.

It is also obvious that the arrangement of the machine of FIG. 4 can produce a large ratio of speeds between roller 64 and roller 66. If each roller can obtain a speed difference of say 4 to 1 by moving axially, the overall speed ratio between the two rollers would be 16 to 1.

In the design of FIG. 4, the cones 60 and 62 act as idlers between the rollers 64 and 66 and the machine is somewhat simpler than that of FIG. 2, but the speed ratio can be much higher and the device may be particularly useful for light loads and instrument application.

As I stated in the referenced application Ser. No. 08/202,164, now U.S. Pat. No. 5,407,399, the roller can be in the shape of narrow wheels equipped with rubber or similar material tires. This, again, is useful for light duty applications, particularly if full lubrication of all of the mechanisms is not desired.

Figure 6:
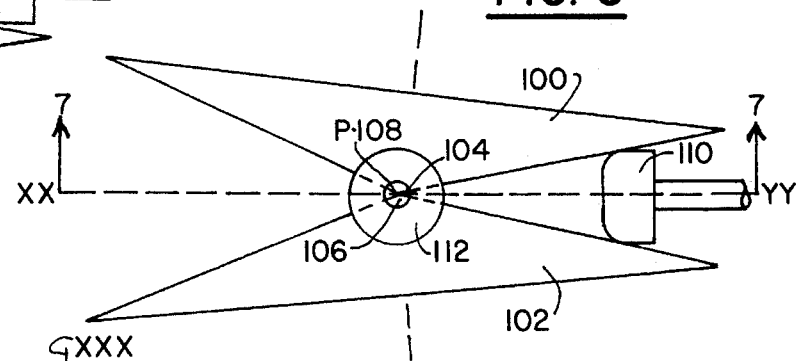
FIG. 6 shows schematically an arrangement of two cones and two rollers where the two rollers have rotating axes at a right angle to each other.

In FIG. 6, I show a different embodiment of my invention. Here I show two cones 100 and 102 that have their apexes 104 and 106 meet at a common point P-108

The cones 110 and 102 are in frictional contact with at least two rollers 110 and 112. The roller 100 rotates about an axis labeled XX-YY that passes through the point P-108. As explained in my co-pending application this will assure the device for mutual friction rolling without spin.

FIG. 6 also shows a second roller 112 that is mounted so as to also contact the cones 100 and 102 but its rotating axis XXX-YYY while also passing through point P-108, is at right angle to the axis XX-YY of roller 110.

Figure 7:
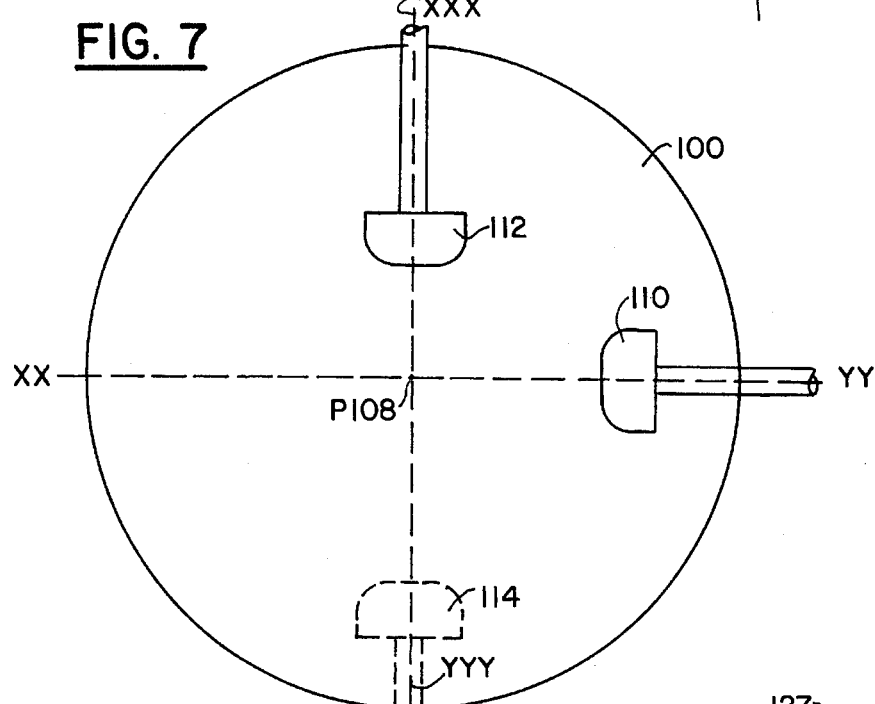
FIG. 7 shows the view of the mechanism of FIG. 6 taken approximately as indicated by arrows 7—7, and showing in dotted lines the position of a possible third roller.

This arrangement is more easily seen in FIG. 7 that is taken approximately at right angle to FIG. 6 as indicated by arrows 7—7. While I show roller 112 as being barrel shaped so that it can contact cones 100 and 102 at different distances from point P-108, the roller 112 can be replaced by a straight sided cone if its position in the mechanism is not to be changed. For example, the roller 112 can be replaced by a cone that spans the entire radial distance of the cones 100 and 102. In that case this intermediate cone would simply be a power take-off from cones 100 and 102 in place of the bevel gearing described in connection with FIGS. 2 and 3.

Figure 10:
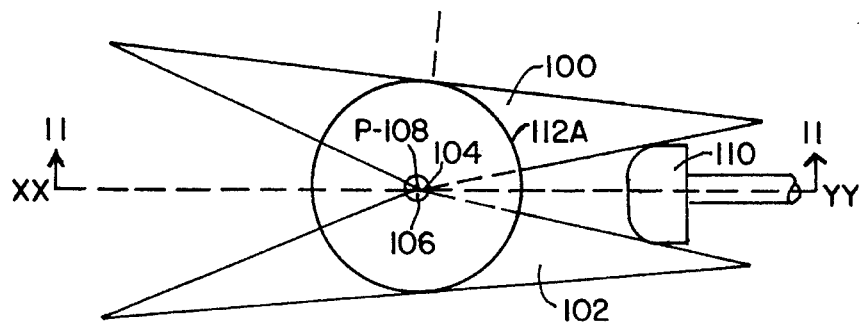
FIG. 10 shows schematically an arrangement of two cones and a roller that is in frictional contact with the two cones, and a top view of a straight sided third cone in contact with the two cones, where the axis of the third straight sided cone is at right angles to the axes of the two cones.
Figure 11:
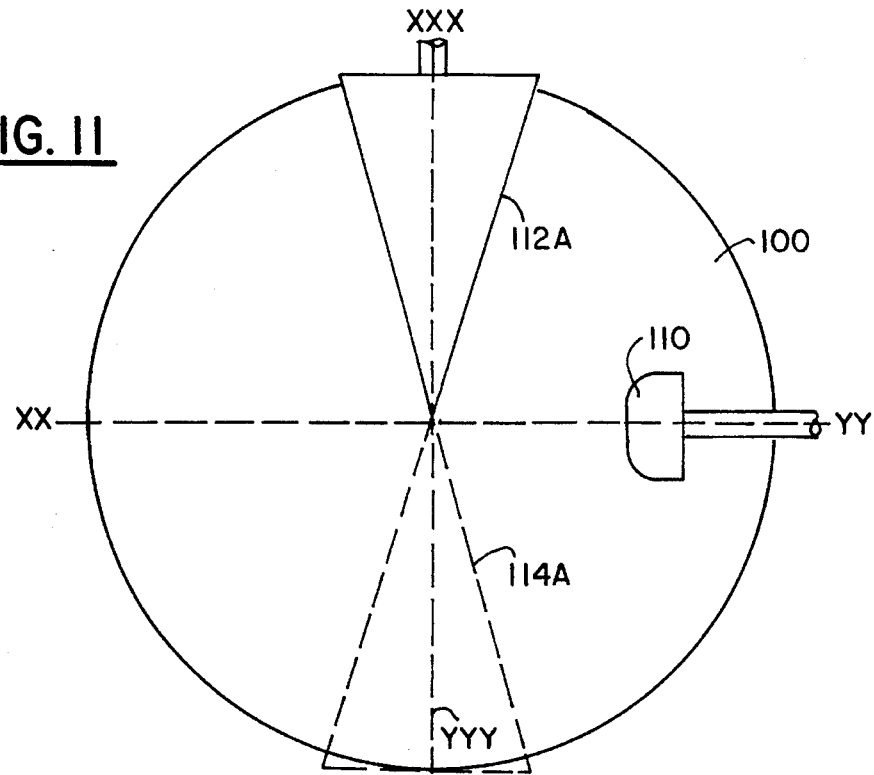
FIG. 11 shows the mechanism of FIG. 10 taken approximately as indicated by arrows 11 and showing in dotted lines the position of a possible fourth cone.

The above modification is illustrated in FIGS. 10 and 11. Here the cone 112 of FIG. 7 is replaced by straight sided cone 112A of FIGS. 10 and 11. Cones 114 of FIG. 7 can be replaced by cone 114A (shown in dotted lines in FIG. 11), and both cones 112A and 114A can be used as power take-offs from cones 100 and 102. It should be noted that cones 112A and 114A will remain in full rolling contacts with cones 100 and 102 independently of the angles that cones 100 and 102 make with each other.

A third possible roller 114 can be made to contact the cones 100 and 102 as shown in FIG. 7. This third roller 114 can be arranged to rotate about the axis XXX-YYY that is common with the axis of roller 112. Because the axes of all three rollers pass through the point P-108 that is common to the cones 100 and 102, all three rollers can roll with high friction without spin.

Figure 8:
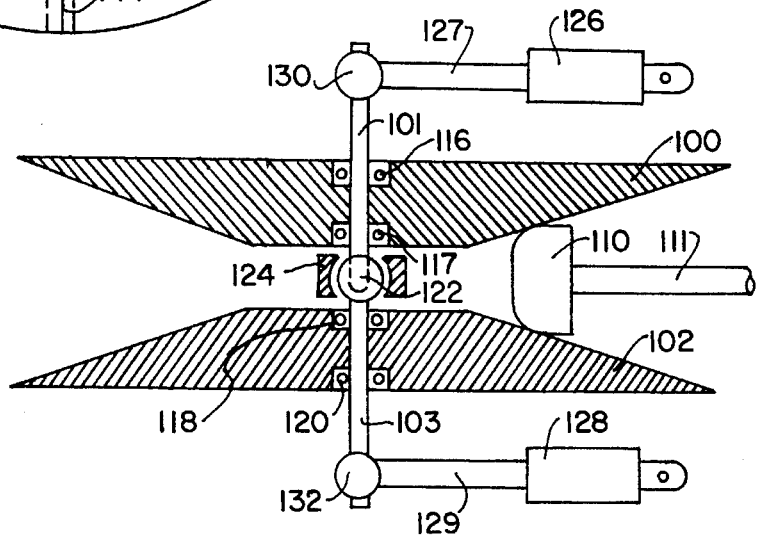
FIG. 8 shows a possible mechanical arrangement of the device of FIGS. 6 and 7.

While I show FIGS. 6 and 7 as a possible schematic arrangement of the components described, a possible mechanical arrangement of the elements of FIGS. 6 and 7 is shown in FIG. 8.

Here the cone 100 is mounted on shaft 101 by two ball bearings 116 and 117. The cone 102 is mounted on shaft 103 by two ball bearings 118 and 120. The two shafts 101 and 103 are coupled by a universal joint 122 so located that the common point of pivoting of shafts 101 and 103 occurs at the common apex of the two cones 100 and 102.

The outside surface of the universal joint 122 can be made in the shape of a sphere so that it can be held in a spherical mount of element 124 that is a fixed part of the whole machine. In this manner the positions of the cones 100 and 102 can be varied without their losing the common axis point P-108.

The shafts 101 and 103 can be moved so as to press firmly against the roller 110 or the other roller 112 (not shown in FIG. 8 for clarity). By axially moving the optional third roller 114, it too can contact the cones 100 and 102 (FIG. 7).

The roller 110 is mounted on shaft 111 so that it can move axially, parallel to itself at all times, as it contacts the cones 100 and 102.

These cones 100 and 102 can be controlled by two double-acting hydraulic cylinders 126 and 128 acting by means of push-pull shafts 127 and 129, respectively, on shafts 101 and 103.

It should be understood that in showing FIG. 8, I left out for the sake of clarity many unimportant mechanical details like collars, fasteners, ball and socket joints 130 and 132 between shafts 127 and 101 and shafts 129 and 103, respectively. As stated earlier I also do not show, for the same reason of clarity, the roller 112 or 114 in FIG. 8.

Figure 9:
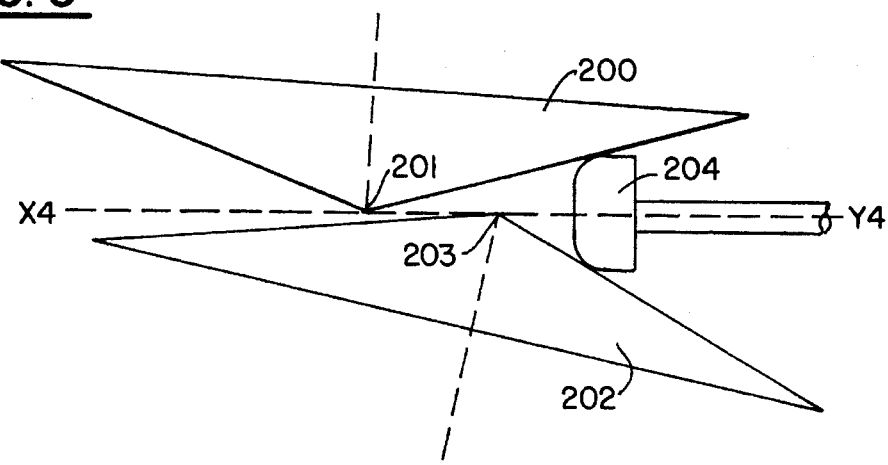
FIG. 9 shows a different arrangement of two cones driven (or driving) by a roller where the apexes of the two cones do not meet at one point, but where the apexes lie on one line that is the rotational axis of the roller.

In FIG. 9, I show a possible schematic arrangement of two cones 200 and 202 that do not necessarily have a common point for their apexes but nevertheless can be driven by one roller 204 without mutual spin.

The roller 204 rotates at all times about the axis X4-Y4. The cone 200 at all times has its apex 201 located on this same axis X4-Y4. The cone 202 at all times must have its apex 203 also on line X4-Y4.

While the speed of the two cones 200 and 202 will be different when their apexes 201, 203 are separated from each other the friction contacts will be correct.

If the two cones 200, 202 are moved relative to each other so that their apexes 201, 203 coincide, the mechanism reduces itself to that of FIG. 1 and the cones 200, 202 will rotate at identical speeds. The possibility to obtain two different output speeds from one input mechanism as by using the device of FIGS. 6, 7, and 8, or the device of FIG. 9 leads to some interesting possible applications. For example, imagine a vehicle where the two driving wheels are also the steering wheels, as in a front-drive vehicle. If the steering angle called for by the steering wheel is measured and fed to a computer, the computer can direct my friction drive machinery to drive the two wheels at different and correct speeds as they are angled by the steering mechanism. This could present skidding, particularly if the vehicle is operating under the uncertain conditions in off-the-road service.

Such computer control would require speed sensors on the input and output of the friction drives but such speed sensors are commercially available and need not be discussed here.

The main advantage of this whole invention is the possible compactness and the simplicity of the drive and cone control.

I claim:

1. A frictional drive comprising two straight-line cones in frictional contact with at least one roller, said cones contacting the said roller so as to transmit motion from said roller to and from said cones, said roller rotating on a fixed axis, said two cones having two separate apexes located on points on said fixed axis, said two apexes moved long said fixed axis so as to change the relative speed between the said two cones.

2. A frictional drive comprising two straight line cones and at least one roller, said cones contacting the said roller so as to transmit motion from said roller to or from said two cones, said roller rotating on a fixed axis, said two cones rotating on two separate axes and having two separate apexes located at a single point on said fixed axis and a third straight line cone rotating about a fourth axis said fourth axis being at a right angle to said fixed axis and at right angles to said two separate axes, said fourth cone being fixed on its axis so as to contact said two straight line cones at constant radial positions on the conical faces of said two straight line cones.

\* \* \* \* \*